United States Patent
Yu et al.

(10) Patent No.: US 11,216,645 B2
(45) Date of Patent: Jan. 4, 2022

(54) MULTI-CAMERA MULTI-FACE VIDEO SPLICING ACQUISITION DEVICE AND METHOD THEREOF

(71) Applicant: Joyware Electronics Co., Ltd., Zhejiang (CN)

(72) Inventors: Jie Yu, Zhejiang (CN); Jiangfeng Yu, Zhejiang (CN); Weiping Zhu, Zhejiang (CN); Xugang Shi, Zhejiang (CN)

(73) Assignee: Joyware Electronics Co., Ltd., Hangzhou (CN)

( * ) Notice: Subject to any disclaimer, the term of this patent is extended or adjusted under 35 U.S.C. 154(b) by 0 days.

(21) Appl. No.: 16/838,024

(22) Filed: Apr. 1, 2020

(65) Prior Publication Data

US 2020/0234036 A1 Jul. 23, 2020

Related U.S. Application Data

(63) Continuation of application No. PCT/CN2019/096716, filed on Jul. 19, 2019.

(30) Foreign Application Priority Data

Oct. 8, 2018 (CN) .......................... 201811166538.4

(51) Int. Cl.
| | |
|---|---|
| *G06K 9/20* | (2006.01) |
| *G06K 9/36* | (2006.01) |
| *G06K 9/00* | (2006.01) |
| *G06T 7/292* | (2017.01) |

(52) U.S. Cl.
CPC ..... *G06K 9/00255* (2013.01); *G06K 9/00268* (2013.01); *G06K 9/00288* (2013.01); *G06K 9/00718* (2013.01); *G06K 9/00765* (2013.01); *G06T 7/292* (2017.01); *G06T 2207/30201* (2013.01)

(58) Field of Classification Search
CPC .......... G06T 2207/30201; G06T 7/292; G06K 9/00221–2009/00328; G06K 9/00765
See application file for complete search history.

(56) References Cited

U.S. PATENT DOCUMENTS

2019/0303683 A1* 10/2019 Pearson ............ G06K 9/00751

FOREIGN PATENT DOCUMENTS

| CN | 104850607 A | 8/2015 |
|---|---|---|
| CN | 108563651 A | 9/2018 |

* cited by examiner

*Primary Examiner* — Brian Werner

(57) ABSTRACT

The present invention discloses a multi-camera multi-face video splicing acquisition device, comprising a plurality of cameras for successively capturing video or images with faces, at least one splicing server for face tracking, face recognition, face cutting, face sorting and face splicing of face videos or images captured by cameras; and at least one time synchronizer for calibrating the time of at least one camera and splicing server; the above devices are interconnected through a network to achieve data interaction with each other. By serially splicing the face images of the same person acquired by multiple cameras, a face sequence of a longer period of time can be formed, and the face sequences sorted by time series could be used to further extract feature information for various time series analysis, and the longer the length of time of the face sequence, the more valid information can be extracted after time-series analysis.

13 Claims, 8 Drawing Sheets

MULTI-CAMERA MULTI-FACE VIDEO SPLICING ACQUISITION DEVICE AND METHOD THEREOF

CROSS REFERENCE TO RELATED APPLICATIONS

The present application is a Continuation Application of PCT Application No. PCT/CN2019/096716 filed on Jul. 19, 2019, which claims the benefit of Chinese Patent Application No. 201811166538.4 filed on Oct. 8, 2018. All the above are hereby incorporated by reference. the contents of which are incorporated herein by reference in their entirety.

FIELD OF THE INVENTION

The present invention relates to video image processing technology and human face acquisition and recognition technology.

BACKGROUND OF THE INVENTION

IP cameras have been widely used and human face AI technology is increasingly mature; however, most face applications are limited to face capture and face comparison. In some technologies, cameras are used to continuously capture video of human face and extract feature points from face video for performing time-series waveform processing and further depth analysis. However, these techniques use a camera to align a face for continuously capturing face video. The acquisition at a single time point or a non-continuous scene is only for a face of a certain period time, which is prone to deformation or low recognition. Apparently, the existing acquisition technology is unable to meet the increasing requirements for recognition with the development of science and technology, and unable to extend the application scenario of the captured images.

SUMMARY OF THE INVENTION

An object of the present invention is to provide a multi-camera multi-face video splicing acquisition device, to achieve accurate and continuous acquisition of face images and provide an accurate and reliable basis for subsequent analysis.

To achieve the object, the present invention adopts the following technical solutions:

A multi-camera multi-face video splicing acquisition device, comprising:

at least one camera for intermittently or successively capturing videos or images with a human face for a continuous or intermittent period of time;

at least one splicing server for face tracking, face recognition, face cutting, face sorting and face splicing of face videos or images captured by one or several cameras;

at least one time synchronizer for calibrating the time of at least one camera and splicing server;

the above devices are interconnected through a network to achieve data interaction with each other.

In some preferred embodiments, there may be one camera; in some preferred embodiments, multiple cameras can be placed at different angles and positions for capturing from different angles, to obtain more comprehensive image information.

In some preferred embodiments, the face video refers to a video containing the state of the face activity; in some preferred embodiments, the face image refers to an image including the each decomposition activity state of the face, in some preferred embodiments, a series of face images may constitute a face video, in some preferred embodiments, the face image may also contain other objects or other parts of the human body.

In some preferred embodiments, face recognition is a recognition for different face, aiming to distinguish different faces and identify the individual differences. In some preferred embodiments, face recognition refers to recognition on the element of human face, aiming to distinguish a person's face from other parts of the body, to judge the number of faces or use as a reference for other standards.

In some preferred embodiments, the face tracking, face recognition, face cutting, face sorting, and face splicing are successively performed. In some preferred embodiments, the face tracking, face recognition, face cutting, face sorting, and face splicing are sequentially performed in order, in some preferred embodiments, the above operations are all directed to a plurality of faces.

In some preferred embodiments, the face tracking, face recognition, face cutting face sorting and face splicing are independently performed. In some preferred embodiments, these operations can be performed relatively independently. For example, the face tracking and face recognition can be performed separately, and face cutting and face recognition can be performed separately, provided that the materials to be cut have been received for face cutting.

In some preferred embodiments, the splicing server performs the above steps and finally obtains a video and/or image having splicing features including at least one face.

In addition, the present invention further provides a multi-camera multi-face video splicing acquisition method, the method adopts the foregoing device and comprises the following steps:

(1) image acquisition: performing continuous acquisition of video or images with faces in a certain scene by multiple cameras;

(2) image sending: sending the captured video or image with the splicing feature to the splicing server by the cameras;

(3) tracking and recognizing: tracking and recognizing human faces by the splicing server for the videos or images;

(4) face cutting: performing, by the splicing server, the face cutting frame by frame, to obtain the face images after cutting;

(5) face sorting: sorting the face images according to different time stamps saved by each face image to obtain a face sequence;

(6) face comparing: matching the face image in the face sequence with the face image in the face comparison library, and storing the unmatched face sequence as new data;

(7) face splicing: Splicing the matched face sequence in the face matching library with the sequence in the library in chronological order to form a new face sequence.

Further, the step (1) further includes decoding the video stream, specifically, extracting the video stream captured by the camera, performing decoding, generating each frame of image and recording a time stamp for each frame of image, and the time stamp being recognized by the time synchronizer. In some preferred embodiments, decoding the video stream may only include the step of decoding, in some preferred embodiments, decoding the video stream may include generating a frame of image, in some preferred embodiments, decoding the video stream further include marking the time stamp of the frame image. In some preferred embodiments, the time stamp may be identified by a time synchronizer, in some preferred embodiments, the time stamp may always follow the marked frame image, in some preferred embodiments, in the step of face sorting, sorting face according to the marked time stamp, and in some preferred embodiments, in the step of face splicing, splicing faces successively according to the marked time stamp.

Further, the recognizing in the step (3) specifically refers to performing multi-face detection on each frame image, and uniquely identifying each detected face, and performing feature point coordinate extraction on the recognized face. In some preferred embodiments, the identifying means to mark different faces such that different faces can be distinguished in subsequent steps, in some preferred embodiments, the feature points refer to the differences between a face and other faces.

Further, the tracking in step (3) means that after recognizing a person's face, the next frame of image should be recognized whether or not to contain the person's face when performing face recognition on each subsequent frame of images, and if so, continue to extract the feature point coordinates, and if not, identify the face as a new face and continue to recognize in the subsequent other images. In some preferred embodiments, the unique mark on the face is brought to the subsequent steps. In some preferred embodiments, the tracking may identify whether the other frame of image includes the recognized face according to the feature points.

Further, the face cutting in the step (4) specifically refers to cutting the face recognized in each frame of image from a large image of the video frame, generating a small image of a single face and copying the time stamp of the frame of image. In some preferred embodiments, the small image of a single face and the large image cut from the video frame have a one-to-one corresponding relationship.

Further, the face sorting in the step (5) specifically refers to sorting the images cut from the same person's face in chronological order as a face sequence, and selecting one image from the face sequence as a face comparison image.

Further, the face comparing in the step (6) specifically refers to comparing the face comparison image in the face sequence with the face comparison image in the face matching library to confirm whether or not to match, and if match (the match herein means that the face comparison image is compared to each image in the face matching library, and the principle for matching is to extract several feature modeling of face to generate a vector with several features, and perform modeling of face images in the face matching library in advance to generate a vector, and then calculate the vector set closest to the vector of the face comparison image, sort them by similarity. Generally a threshold can be set, to determine the similarity greater than xx % as matching, for example, a similarity greater than 75% is considered to be a match, and the specific value of the similarity may be determined according to needs, or may be adjusted according to actual conditions, and the closest similarity is selected if there are multiple values), the face sequence and the corresponding face sequence in the face matching library belong to the same face, and if not match, the face sequence is considered to belong to a new face, and the face sequence is added to the face matching library.

Further, the face splicing of step (7) specifically means that, if the current face sequence matches the face sequence in the face matching library successfully, the two face sequences are considered to belong to the same face, and the current face sequence and the face sequence in the face matching library are spliced in chronological order to form a new face sequence, and the new face sequence is associated with the face sequence in the face matching library.

In some preferred embodiments, the method of the present invention further comprises a step of performing time-series waveform analysis on the face sequence after multiple splicing, in some preferred embodiments, the time-series waveform analysis means to splice discontinuous waveforms according to the cycle of fluctuation to form a complete long-cycle waveform. In some preferred embodiments, the collected face sequences may be discontinuous. For example, if the face sequences cannot form a complete face motion after splicing, it may be considered that the face sequence is discontinuous. In some preferred embodiments, a plurality of discontinuous sequences may be formed for the same face according to the method of the invention, at this time, the small image of each single face can be considered as an element in the sequence. In a plurality of continuous sequences of the same face, there may be a plurality of repeated elements. In this case, these discontinuous face sequences may be spliced to a continuous sequence for the same face by time-series waveform analysis. In some preferred embodiments, several segments of waveforms are spliced according to the waveform cycle.

In some preferred embodiments, the time-series waveform analysis comprises selecting an area of each face of each frame, and extracting the values having several bits from each color in each pixel of the region and combining them, to form a digit. In some preferred embodiments, the selected region can be surrounded by a plurality of feature points, and then the digit generated by each pixel of the region is averaged to obtain a value of the frame, and then horizontally arrange according to the time stamp of each frame to form a time-series waveform. In some preferred embodiments, the color of the pixel is RGB color. In some preferred embodiments, the pixel of images can be represented by red, green, and blue respectively, or represented in combination. In some preferred embodiments, in terms of digits, each color may be represented by 8bi or 16 bit respectively.

In some preferred embodiments, the time-series waveform analysis may be considered to perform screening and recombination of the acquired face sequences, to obtain a more complete face splicing sequence. In some preferred embodiments, a filtering operation may also be performed on long-cycle waveforms. The filtering operation ensures the accuracy of long-cycle waveforms, thereby ensuring the orderliness and accuracy of face sequences spliced according to long-cycle waveforms.

The present invention can achieve the following beneficial effects. The object of the invention is to simultaneously collect a plurality of faces without perception by a plurality of networked cameras and splicing each person's face in chronological order. By serially splicing the face images of the same person acquired by multiple cameras, a face sequence of a longer period of time can be formed, and the face sequences sorted by time series could be used to further extract feature information for various time series analysis, and the longer the length of time of the face sequence, the more valid information can be extracted after time-series analysis. For example, a plurality of cameras are installed in the security check, and when the persons to be checked pass through these cameras, face sequence fragments will be captured by the cameras, and after splicing these face sequence fragments, analysis of emotional stress can be performed. For example, several cameras are installed in an open pension place, when elderly people walk in the open place, a plurality of fragments will be captured by the cameras, and these face sequence fragments are spliced for analysis of various physical sign indexes. In theory, face sequences can be spliced without restriction.

DETAILED DESCRIPTION

The technical solutions of the present invention are further described in detail below with reference to the accompanying drawings. It should be noted that the embodiments are merely illustrative of the invention and should not be construed as limiting the invention. The embodiments may include a number of examples, and each example may achieve the whole or part of the technical solutions of the present invention independently or in combination. Examples may be complete technical solutions or may be a part of the present invention, and should not be considered as the whole of the present invention. It should be appreciated that those skilled in the art may obtain other embodiments based on these embodiments without any creative work.

The drawings referred to in the detailed description are merely for the purpose of illustrating the embodiments of the invention and demonstrating one or more implementations of the present invention. It should be appreciated that those skilled in the art may obtain other drawings based on these drawings without any creative work.

Example 1 A Multi-Camera Multi-Face Video Splicing Acquisition Device

Figure 1:
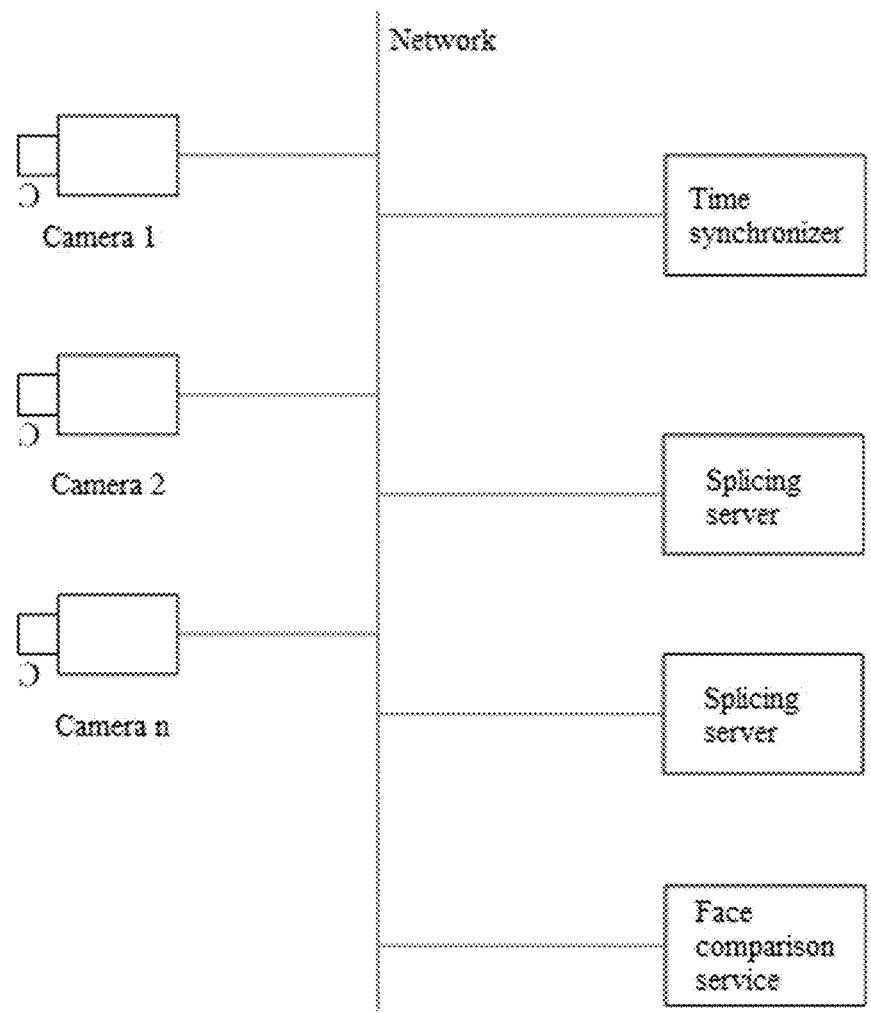
FIG. 1 is a schematic view of the overall structure of the present invention.

Referring to FIG. 1, the present invention may include multiple cameras for successively capturing videos or images with faces, such as camera 1, camera 2, . . . , camera n. These cameras may be of the same or different configurations, but all of them have the function of continuously capturing videos or images. In some preferred embodiments, these cameras may be connected to a server or a cloud wiredly or wirelessly, thereby realizing interactions with other devices.

As shown in FIG. 1, the present invention may further include at least one splicing server. In this embodiment, two splicing servers are included, and the splicing servers are configured to perform face tracking, face recognition, face cutting, face sorting, and face splicing on the face videos or images captured by cameras.

In some preferred embodiments, a splicing server may process videos and/or images input by 5 to 10 cameras simultaneously. In some preferred embodiments, the processing capacity of the splicing server can be expanded, or the number of splicing servers can be increased. In some preferred embodiments, there are sufficient numbers of splicing servers and cameras, and the splicing server may just complete the processing of videos or images captured by cameras.

At least one time synchronizer for calibrating the time of cameras and splicing servers; in some preferred embodiments, the time synchronizer can be used to add a time stamp to each frame of image in the camera and the splicing server. In some preferred embodiments, the time synchronizer may identify these time stamps. In some preferred embodiments, the time synchronizer feeds back the recognition results to the splicing server. In some preferred embodiments, there is one set of time synchronizer, and in some preferred embodiments, there are a plurality of time synchronizers that adopt the same format of time stamp.

The above devices are interconnected through a network to achieve data interaction with each other.

In some preferred embodiments, the network may be an internal network with a security code. In some preferred embodiments, the network may be a public network; in some preferred embodiments, the network may be a cloud, and in some preferred embodiments, the network may be extended.

Example 2 A Multi-Camera Multi-Face Video Splicing Acquisition Method

Figure 2:
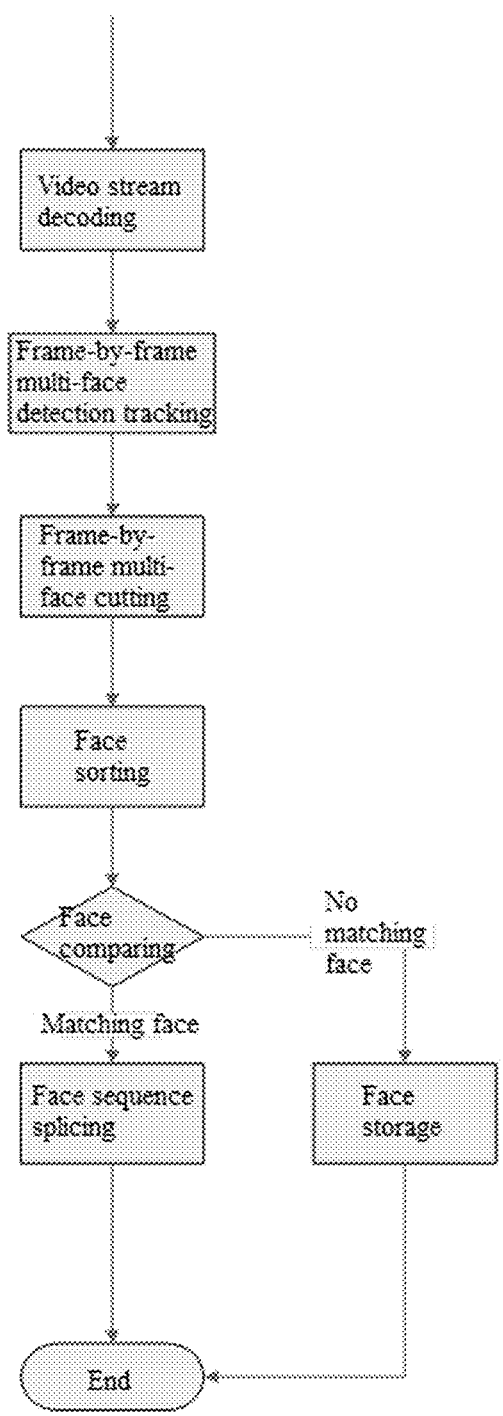
FIG. 2 is an overall flow chart of the present invention.

FIG. 2 shows a method for realizing the present invention. In the method, the invention adopts the multi-camera multi-face video splicing acquisition device of Example 1 for splicing, comprising the following steps:

(1) Image acquisition: Multiple cameras capture the videos or images with a face in a scene successively, extract the video stream captured by the cameras and perform decoding, generate each frame image and record a time stamp for each frame image, and the time stamp is capable of being recognized by the time synchronizer.

In some preferred embodiments, the time stamp may be generated by the time synchronizer; in some preferred embodiments, the time stamp may also be input externally and can be recognized by the time synchronizer. In some preferred embodiments, time stamps of the unified standard are used for one successive acquisition. In some preferred embodiments, the time stamps will always follow the marked frame images once marked. In some preferred embodiments, the time stamp can be replaced with other forms of marks that can mark the acquired and decoded frame images in sequence and can be identified by the time synchronizer.

In some preferred embodiments, the role of the time synchronizer is to ensure that the time of the images in the camera is consistent with that in the splicing server. In some preferred embodiments, the order of the images can be calibrated in the form of a mark, at this time, the time synchronizer can be replaced by other mark modules having the same functions. In some preferred embodiments, the time synchronizer can be used to calibrate the time of the camera and the splicing server. In some preferred embodiments, the time of each camera and each splicing server is calibrated by the time synchronizer at a time interval.

(2) Image sending: The cameras send the captured videos or images with the splicing feature to the splicing server for subsequent processing by the splicing server. In this embodiment, it may be a continuous picture or process in a scene, that is, continuously collecting images in a process, and these images are actually different pictures of a continuous video at each time point. These images are considered having splicing features.

In some preferred embodiments, images may be sent in real time, in some preferred embodiments, images may be stored in the cameras, and in some preferred embodiments, images can be stored in the splicing server. In some preferred embodiments, the stored images can be retrieved. In some preferred embodiments, the camera can store the images while sending images. In some preferred embodiments, the splicing server can store the images before and after splicing.

Figure 3:
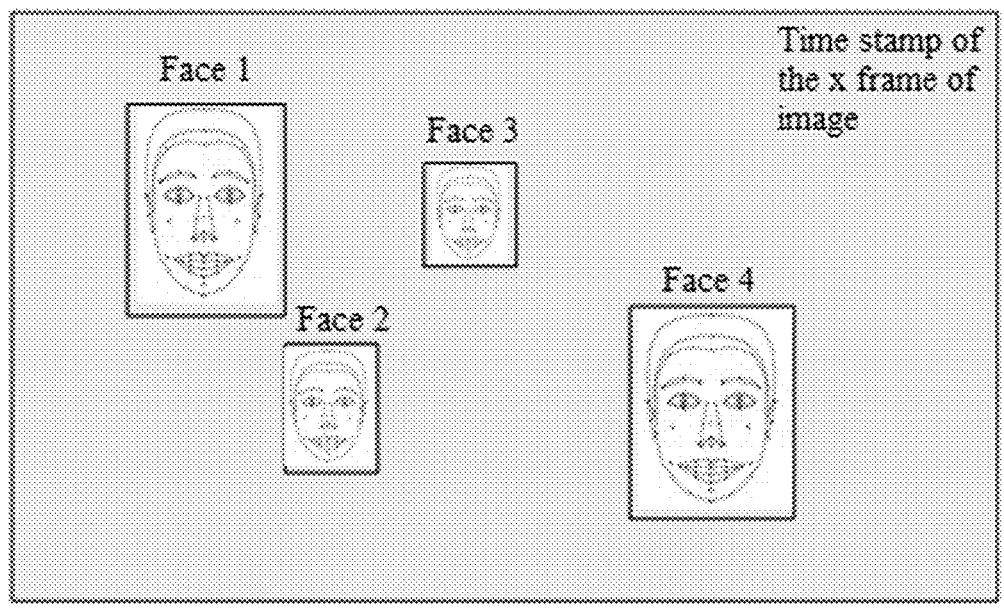
FIG. 3 is a schematic view of face tracking and recognizing of the present invention.
Figure 7:
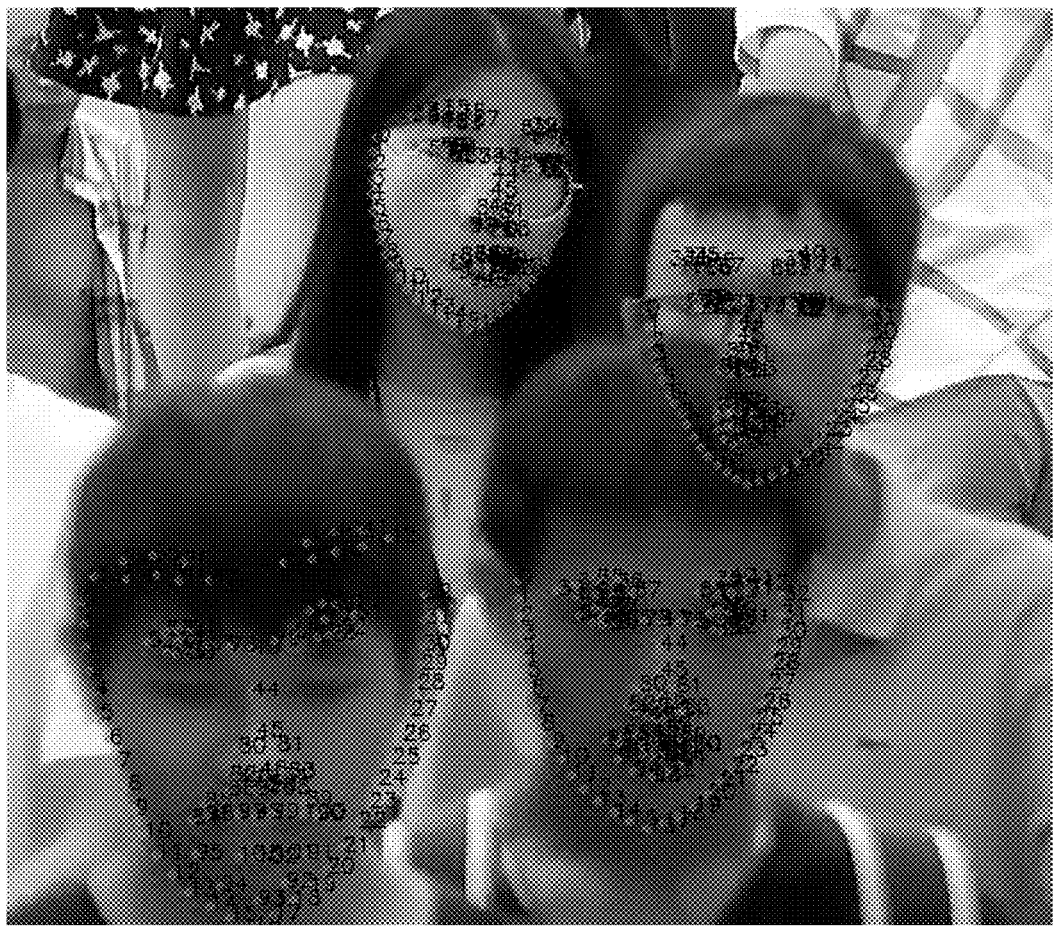
FIG. 7 is a schematic view of selection of feature points of multi-face detection.
Figure 8:
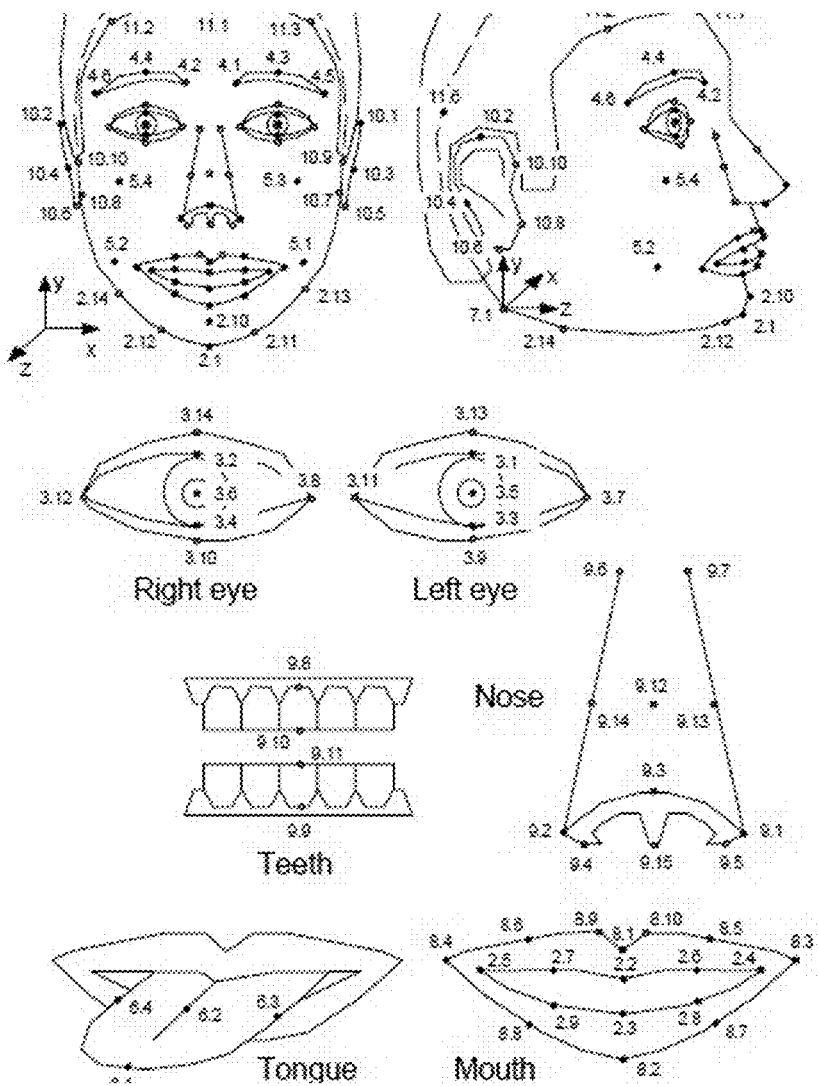
FIG. 8 is a schematic view of feature points.

(3) Tracking and recognizing: As shown in FIG. 3, the splicing server tracks and recognizes human faces for the videos or images, wherein the recognizing specifically refers to multi-face detection for each frame image x, and presently the face detection algorithm is mature, with many methods available. We can use the prior art. In the prior art, there are circumstances of face overlapping, as shown in FIG. 7. At this time, the face feature points can be extracted, and according to the rough features of faces, for example, the face-independent positions, the position of face basic element can be judged and can be verified in the subsequent steps. If the judgment to verify the location is correct, then it is adopted as a learning process. If the verification is wrong in the subsequent steps, the feature point can be excluded, and prediction and verification can be performed again in the next extraction. In addition, if the feature points are coincident, the coincident feature points or the feature points in the covered part can be ruled out during the timing process. In addition, if the face angle is too large, it may cause feature points to be repeated or to be missing. Because the face angle is too large, it needs to be eliminated. The multi-face detection is to detect all the faces in the picture at the same time, instead of just identifying a person's face in a picture, and each face Y detected is uniquely identified, and feature point coordinates are extracted for the recognized face; tracking means that after a certain face is recognized, it is required to identify whether the next frame image x1 includes the face Y for the face recognition of the subsequent each frame image x, and if so, continue to extract feature point coordinates, and if not, identify as a new face Y1. The recognition of Y1 is continued in the subsequent images, that is, when a new face Yn is recognized, the subsequent recognition must continue to identify $Y_n$, as shown in FIG. 8. In the ISO/IEC 14496-2 (MPEG-4) specification, some feature points of the face are defined, for example, a few points of the nose and the eye, but in fact, different services may expand the feature points. All points used are defined in the MPEG-4.

In some preferred embodiments, the feature points selected can be added or deleted according to actual needs. In some preferred embodiments, the feature points include a part of a face of a person that may be different from faces of other persons, for example, the size of nose tip, the height of bridge of a nose, etc. In some preferred embodiments, the feature points may include an element that is easily identified in the image recognition. In some preferred embodiments, the feature points may be individual elements or a combination of elements. In some preferred embodiments, the recognition priority of feature points may be set, for example, identifying some elements in priority, for example, the eye size. When a person's face cannot be distinguished from other persons' faces by these elements, other elements should be further identified, and so forth.

(4) face cutting: The splicing server performs face cutting frame by frame, to obtain the face image y after cutting; specifically cutting the face recognized in each frame of image x from a large image Y of the video frame, generating a small image y of a single face and copying the time stamp of the frame of image x. The time stamp can be used as the basis for subsequent sorting and splicing. According to this method, there will be multiple frames of images in the captured video, and each frame of image will correspond to a small image y. When a video is cut, it will form a plurality of small images $y_1$. $y_2$. $y_3$. $y_4$ . . . $y_n$ for one face Y, where n is a constant, which can be determined according to the number of captured or recognized video frames.

Figure 4:
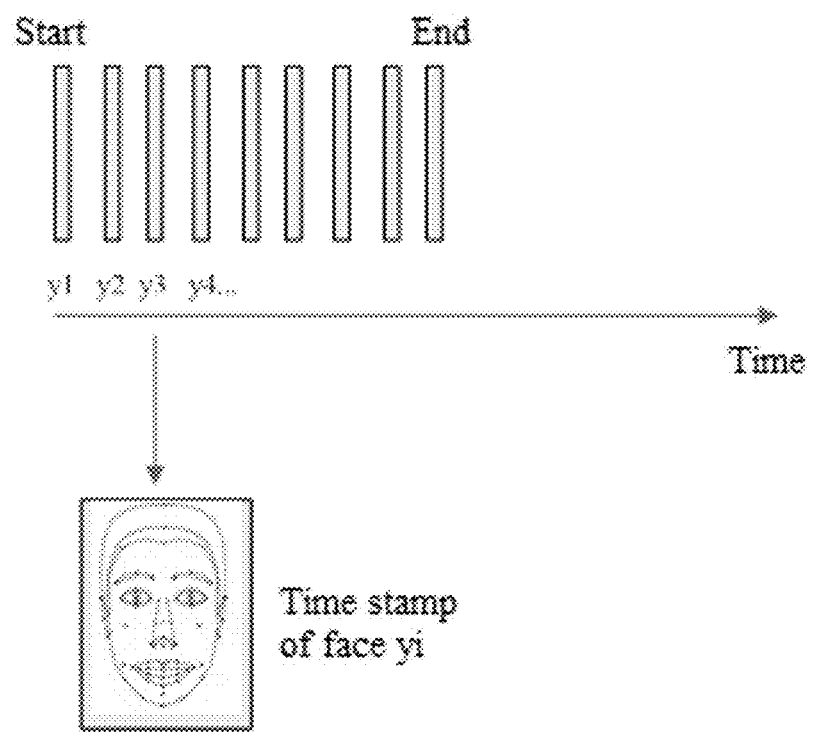
FIG. 4 is a schematic view of face sorting of the present invention.

(5) Face sorting: Sort the face images according to different time stamps saved by each face image $y_1$. $y_2$. $y_3$. $y_4$ . . . $y_n$. As shown in FIG. 4, the face sequence is obtained in chronological order. In the face sequence, a better quality image $y_a$ can be selected as the face comparison image, which can be used for subsequent comparison, and $y_a$ is from $y_1$. $y_2$. $y_3$. $y_4$ . . . $y_n$, that is, a=1 2, 3, 4, . . . , n. The better quality means that the face images have high definitions and small steering angles;

(6) Face comparing: matching the face image in the face sequence $y_1$. $y_2$. $y_3$. $y_4$ . . . $y_a$ with the face image in the face matching library, and storing the unmatched face sequence as new data; specifically, comparing the face comparison image $y_a$ in the face sequences $y_1$. $y_2$. $y_3$. $y_4$ . . . . $y_n$ with face comparison image $y_b$ of all face sequences in the face matching library (b is only a code name used to distinguish from a, no special meaning), to confirm whether it matches, if it matches a suitable face sequence z (z contains $z_1$. $z_2$. $z_3$. $z_4$ . . . $z_n$, and the face comparison image of z may be $z_a$), the face sequence is considered to be the same face as the corresponding face sequence in the face matching library, and if not match, the face sequence is considered to be a new face, and the face sequence is added to the face matching library.

Figure 5:
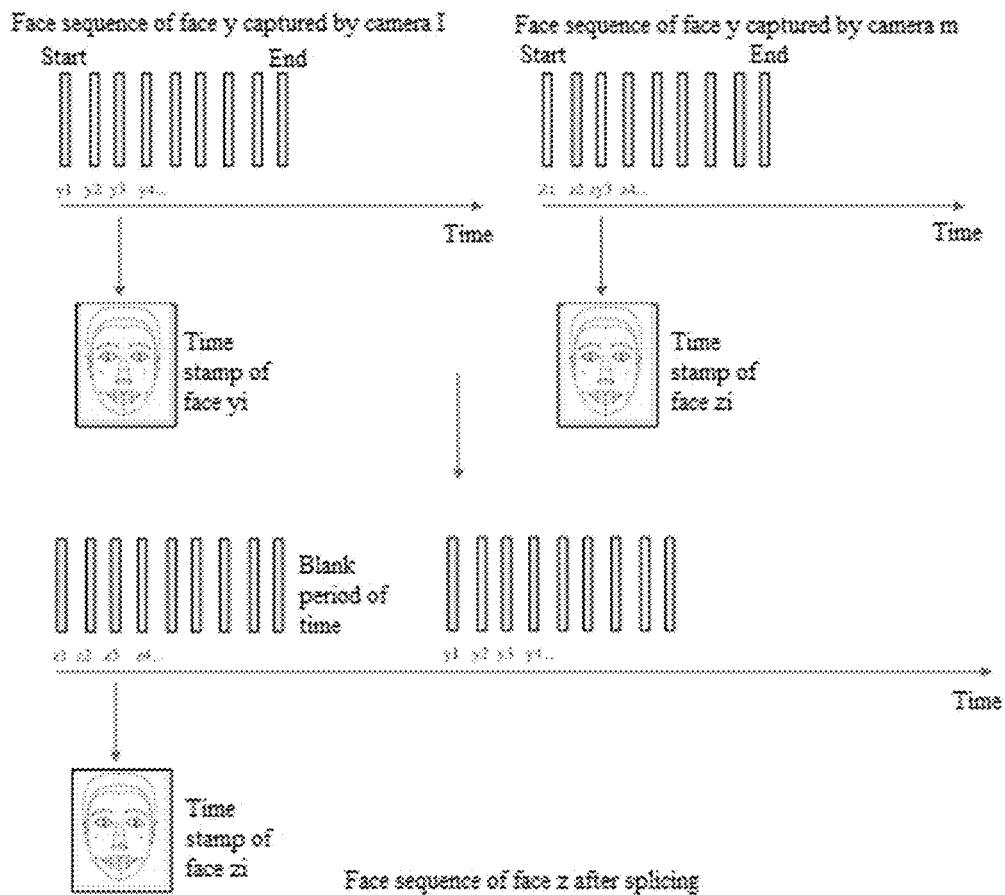
FIG. 5 is a schematic view of face splicing of the present invention.

(7) Face splicing: Splicing the matched face sequence in the face matching library with the sequence in the library in chronological order to form a new face sequence, as shown in FIG. 5, face splicing specifically means that, if the current face sequence $y_1$. $y_2$. $y_3$. $y_4$ . . . $y_n$ matches the face sequence $z_1$. $z_2$. $z_3$. $z_4$ . . . $z_n$ in the face matching library successfully, the two face sequences are considered to belong to the same face, and the current face sequence and the face sequence in the face matching library are spliced in chronological order to form a new face sequence, and the new face sequence is associated with the face sequence in the face matching library.

Figure 6:
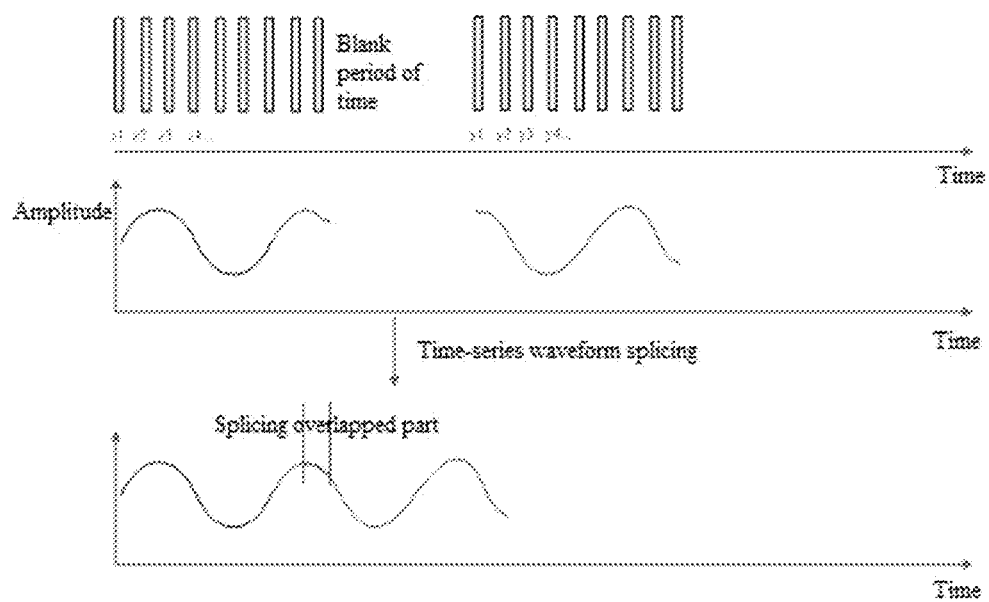
FIG. 6 is a schematic view of splicing of time-series waveforms.

In addition, the present invention may also perform time-series waveform analysis on the face sequence after multiple splicing, as shown in FIG. 6. After a plurality of splicing of face sequences, the time span of the face sequence will be relatively long, but generally there is no sampling in blank period of time, and when time-series waveform analysis is performed on some feature points of the spliced face sequence, a plurality of discontinuous waveforms may be formed. The several discontinuous waveforms may be spliced according to the cycle of fluctuation to form a complete long-cycle waveform. Long-cycle waveform means to splice several waveforms together. The splicing should be performed according to the cycle of waveforms. Specifically, extracting the values having several bits from each color in each pixel RGB (the pixel of images are represented by combined color of red, green, and blue, and each color is represented by 8bi or 16 bit) of the region of each face and each frame (this region can be surrounded by multiple feature points) to form a digit, and then the digit generated by each pixel of the region is averaged to obtain a value of the frame, and then horizontally arranged according to the time stamp of each frame to form a time-series waveform. (The actual application sometimes involves filtering, etc.).

The foregoing description is merely the specific embodiment of the invention, but the scope of the invention is not limited thereto, and any changes or substitutions without creative work shall fall into the scope of protection of the invention. Therefore, the scope of protection of the invention should be based on the scope of protection claimed by the claims.

What is claimed is:

1. A multi-camera multi-face video splicing acquisition method, wherein the method adopts a multi-camera multi-face video splicing acquisition device comprising:
   at least one camera for intermittently or successively capturing videos or images with a human face for a continuous or intermittent period of time;
   at least one splicing server for face tracking, face recognition, face cutting, face sorting and face splicing of face videos or images captured by one or several cameras;
   at least one time synchronization circuit for calibrating the time of at least one camera and splicing server;
   the at least one camera, the at least one splicing server, the at least one time synchronization circuit being interconnected through a network to achieve data interaction with each other, and the method comprises the following steps:
   (1) image acquisition;
   (2) image sending: sending videos or images with splicing features to the splicing server;
   (3) tracking and recognizing: tracking and recognizing human faces for the videos or images;
   (4) face cutting: performing face cutting frame by frame, to obtain the face images after cutting;
   (5) face sorting: sorting the face images according to different time stamps saved by each face image to obtain a face sequence;
   (6) face comparing: matching the face image in the face sequence with the face image in a face matching library, and storing the unmatched face sequence as new data;
   (7) face splicing: Splicing the matched face sequence in the face matching library with the sequence in the library in chronological order to form a new face sequence;
   the method further comprises a step of decoding a video stream in the step (1), specifically, extracting the video stream captured by the camera, performing decoding, generating each frame of image and recording a time stamp for each frame of image, and the time stamp being recognized by the time synchronization circuit.

2. The multi-camera multi-face video splicing acquisition method according to claim 1, wherein the image acquisition and the image sending are performed by at least one camera.

3. The multi-camera multi-face video splicing acquisition method according to claim 1, wherein the tracking and recognizing, face cutting, face sorting, face matching and face splicing are performed by the splicing server.

4. The multi-camera multi-face video splicing acquisition method according to claim 1, wherein the recognizing in the step (3) specifically refers to performing multi-face detection on each frame of image, and uniquely identifying each detected face, and performing feature point coordinate extraction on the recognized face.

5. The multi-camera multi-face video splicing acquisition method according to claim 1, wherein the tracking in step (3) means that after recognizing a person's face, the next frame of image should be recognized whether or not to contain the person's face when performing face recognition on each subsequent frame of images, and if so, continue to extract the feature point coordinates, and if not, identify the face as a new face and continue to recognize in the subsequent other images.

6. The multi-camera multi-face video splicing acquisition method according to claim 1, wherein the face cutting in the step (4) specifically refers to cutting the face recognized in each frame of image from images of the video frame, generating an image of a single face and copying the time stamp of the frame of image.

7. The multi-camera multi-face video splicing acquisition method according to claim 4, wherein the face sorting in the step (5) specifically refers to sorting the images cut from the same person's face in chronological order as a face sequence, and selecting one image from the face sequence as a face comparison image.

8. The multi-camera multi-face video splicing acquisition method according to claim 5, wherein the face comparing in the step (6) specifically refers to comparing the face comparison image in the face sequence with the face comparison image in the face matching library to confirm whether or not to match, and if match, the face sequence and the corresponding face sequence in the face matching library belong to the same face, and if not match, the face sequence is considered to belong to a new face, and the face sequence is added to the face matching library.

9. The multi-camera multi-face video splicing acquisition method according to claim 7, wherein the face splicing of step (7) specifically means that, if the current face sequence matches the face sequence in the face matching library successfully, the two face sequences are considered to belong to the same face, and the current face sequence and the face sequence in the face matching library are spliced in chronological order to form a new face sequence, and the new face sequence is associated with the face sequence in the face matching library.

10. The multi-camera multi-face video splicing acquisition method according to claim 1, wherein the method further comprises a step of performing time-series waveform analysis on the face sequence after multiple splicing, and splicing discontinuous waveforms in the time-series waveform analysis according to the cycle of fluctuation to form a complete long-cycle waveform.

11. The multi-camera multi-face video splicing acquisition method according to claim 1, wherein the face tracking, face recognition, face cutting, face sorting, and face splicing are successively performed.

12. The multi-camera multi-face video splicing acquisition method according to claim 1, wherein the face tracking, face recognition, face cutting face sorting and face splicing are independently performed.

13. The multi-camera multi-face video splicing acquisition method according to claim 12, wherein the splicing server performs the face tracking, face recognition, face cutting face sorting and face splicing and finally obtains a video and/or image having splicing features including at least one face.

* * * * *